(12) United States Patent
Ishizuka (10) Patent No.: US 11,465,078 B2
(45) Date of Patent: Oct. 11, 2022

(54) FILTER DEVICE AND FILTRATION APPARATUS

(71) Applicant: YAMASHIN-FILTER CORP., Kanagawa (JP)

(72) Inventor: Makoto Ishizuka, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 558 days.

(21) Appl. No.: 16/557,717

(22) Filed: Aug. 30, 2019

(65) Prior Publication Data

US 2020/0016519 A1 Jan. 16, 2020

Related U.S. Application Data

(63) Continuation of application No. PCT/JP2018/009715, filed on Mar. 13, 2018.

(30) Foreign Application Priority Data

Mar. 16, 2017 (JP) .............................. JP2017-050773

(51) Int. Cl.
*B01D 29/88* (2006.01)
*B01D 29/15* (2006.01)

(52) U.S. Cl.
CPC ............. *B01D 29/88* (2013.01); *B01D 29/15* (2013.01); *B01D 2201/301* (2013.01); *B01D 2201/64* (2013.01)

(58) Field of Classification Search
CPC combination set(s) only.
See application file for complete search history.

(56) References Cited

U.S. PATENT DOCUMENTS

| 5,707,527 A | * | 1/1998 | Knutson | .................... C02F 1/28 210/170.03 |
| 2010/0163479 A1 | * | 7/2010 | Kim | ........................ E03B 11/06 210/348 |
| 2017/0296947 A1 | * | 10/2017 | Chikugo | ............... F15B 21/041 |

FOREIGN PATENT DOCUMENTS

| CN | 2324352 Y | 6/1999 |
| CN | 104204496 A | 12/2014 |
| JP | S63-160908 U | 10/1988 |

(Continued)

OTHER PUBLICATIONS

Office Action issued in Chinese Patent Application No. 201880014616.0 dated Feb. 24, 2021, with English Translation (16 pages).

(Continued)

*Primary Examiner* — Jonathan M Peo
(74) *Attorney, Agent, or Firm* — Nakanishi IP Associates, LLC (57) ABSTRACT

A rod having a substantially-cylindrical shape with both ends being covered is provided to a lid body, which covers an upper end surface of a case having a bottomed substantially-cylindrical shape, the rod protruding in the case. A first hole is formed in a portion of a side surface of the rod, which is exposed to the inside of the case. Further, an air vent pit (passage) is formed in the lid body, and a second hole is formed in a portion of the side surface of the rod, which is exposed to the inside of the air vent pit. A moving member moves along the rod from a first position at which the moving member does not cover the first hole and a second position at which the moving member covers the first hole.

9 Claims, 4 Drawing Sheets

(56) References Cited

FOREIGN PATENT DOCUMENTS

| JP | S64-29263 U | 2/1989 |
|---|---|---|
| JP | H06-323453 A | 11/1994 |
| JP | 2006-046142 A | 2/2006 |
| JP | 2017-6831 A | 1/2017 |
| JP | 2017-80716 A | 5/2017 |
| WO | 2016/051525 A1 | 4/2016 |

OTHER PUBLICATIONS

Extended European Search Report issued in European Patent Application No. 18768218.2, dated Jan. 29, 2020 (4 pages).
Office Action issued in European Patent Application No. 18768218.2 dated Apr. 29, 2020 (3 pages).
International Search Report issued in PCT/JP2018/009715 dated May 15, 2018 with English Translation (5 pages).

* cited by examiner

FILTER DEVICE AND FILTRATION APPARATUS

CROSS-REFERENCE TO RELATED APPLICATIONS

This application is a continuation application of International Patent Application No. PCT/JP2018/009715 filed on Mar. 13, 2018 (published as WO2018/168847A1 on Sep. 20, 2018), which claims priority to Japanese Patent Application No. 2017-050773 filed on Mar. 16, 2017, the entire contents of which are incorporated by reference.

TECHNICAL FIELD

The present invention relates to a filter device and a filtration apparatus.

BACKGROUND ART

Patent Document 1 discloses a filter in which an air vent hole having one end opening to an inflow space and another end opening to an outflow space is formed in a filter case and in which a float that moves vertically in accordance with a liquid surface height in the inflow space is provided to the opening of the air vent hole on the inflow space side. In the case of this filter, when air stagnates in the inflow space and the liquid surface height is lower than a predetermined position, the float moves downward, and the float moves away from the opening on the inflow space side to open the opening. Further, when air comes out and the liquid surface height is higher than the predetermined position, the float moves upward, and the float abuts the opening on the inflow space side to close the opening.

CITATION LIST

Patent Document

Patent Document 1: JP 2006-046142 A

The invention described in Patent Document 1 is for discharging the air stagnating in the filter case in a process of filtrating the liquid and has a problem in that air in the filter case before filtration (hereinafter, referred to as initial air) cannot be discharged.

When the initial air passes through the filter, a malfunction may occur in a pump due to suction of the air by the pump, or damage and the like may occur in a component due to temporarily extremely high temperature and pressure of hydraulic oil caused by air bubbles being ruptured.

Further, in Patent Document 1, the air stagnating in the filter case is discharged to the outside of the filter through an outflow path through which the liquid after filtration also passes, and hence there is a problem in the air is discharged from the filter together with the liquid after filtration.

SUMMARY OF INVENTION

One or more embodiments of the present invention has been made in view of such problem and has an object of providing a filter device capable of discharging initial air to the outside through a pathway different from that of liquid.

A filter device according to one or more embodiments of the present invention includes a case that has a bottomed substantially-cylindrical shape with an opened upper end surface; a lid body that covers the upper end surface; a rod (rod shaped member) provided to the lid body and protruding in the case; a moving member including a tubular hole into which the rod is inserted, the moving member moving along the rod by the tubular hole sliding along the rod; a filter element provided in the case and to a lower side with respect to the rod and the moving member; an inflow portion that allows a space inside the case and outside the filter element and a space outside the case to communicate with each other; and an outflow portion that allows a space inside the filter element and a space outside the case to communicate with each other. An air vent pit (passage) is formed in the lid body. The rod is a substantially-cylindrical member with both ends covered. A first hole is formed in a portion of a side surface of the rod, which is exposed to the inside of the case. A second hole is formed in a portion of the side surface of the rod, which is exposed to the inside of the air vent passage. The moving member is provided and movable between a first position at which the moving member does not cover the first hole and a second position at which the moving member covers the first hole.

With the filter device according to one or more embodiments of the present invention, the rod having a substantially-cylindrical shape with both the ends covered is provided to the lid body, which covers the upper end surface of the case having a bottomed substantially-cylindrical shape, the rod protruding in the case. The first hole is formed in a portion of the side surface of the rod, which is exposed to the inside of the case. Further, the air vent passage is formed in the lid body, and the second hole is formed in a portion of the side surface of the rod, which is exposed to the inside of the air vent passage. The moving member moves along the rod from the first position at which the moving member does not cover the first hole and the second position at which the moving member covers the first hole. When the moving member is at the first position, the outside of the case and the inside of the case communicate with each other through the hollow portion of the rod and the air vent passage. With this, the initial air in the case can be discharged to the outside through a pathway different from that of the liquid.

Further, with the filter device according to the present invention, when the moving member is at the second position, the moving member covers the first hole. Therefore, the liquid inside the case can be prevented from being discharged to the outside through the air vent passage.

Here, the case may store liquid to be filtrated. The moving member may be floatable on the liquid and moves from the first position to the second position with a rise of a liquid surface. When the moving member is at the second position, a diameter of a portion in which the moving member and a back surface of the lid body abut each other may be equal to or less than two times an inner diameter of the tubular hole. With this, the moving member is prevented from adhering to the lid body due to a surface tension of the hydraulic oil, and the moving member can move downward along with the lowering oil surface.

Here, a recessed portion may be formed in the back surface of the lid body. The rod may protrude in the recessed portion. The moving member may have an outer diameter substantially equal to an inner diameter of the recessed portion. When the moving member is at the first position, at least a part of an outer circumferential surface of the moving member may face an inner circumferential surface of the recessed portion. With this, movement of the moving member is guided by the recessed portion, and the moving member can move smoothly.

Here, the lid body may be provided to an outer side of a tank. The case may be provided inside the tank through an opening formed in the tank. The air vent passage may have a substantially L-like shape in a side view and may include an end opened to a lower surface of the lid body to allow the space inside the case and the space outside the case to communicate with each other. With this, even when the hydraulic oil flows in the air vent passage, the hydraulic oil can be returned to the tank to prevent leakage to the outside.

In order to achieve the above-mentioned object, for example, a filtration apparatus includes a tank including an opening formed in a top surface of the tank; and a filter device provided to the tank. The filter device includes a case that has a bottomed substantially-cylindrical shape and is provided inside the tank through the opening; a lid body that covers the opening and an upper surface of the case and is provided to an outer side of the tank; a rod provided to the lid body and protruding in the case; a moving member including a tubular hole into which the rod is inserted, the moving member moving along the rod by the tubular hole sliding long the rod; a filter element provided in the case and to a lower side with respect to the rod and the moving member; an inflow portion that allows a space inside the case and outside the filter element and a space outside the case to communicate with each other; and an outflow portion that allows a space inside the filter element and a space outside the case to communicate with each other. An air vent passage, which has a substantially L-like shape (L shape) in a side view and includes one end opened to a lower surface of the lid body to allow a space inside the tank and outside the case and a space inside the case to communicate with each other, is formed in the lid body. The rod is a substantially-cylindrical member with both ends being covered. A first hole is formed in a portion of a side surface of the rod, which is exposed to the inside of the case. A second hole is formed in a portion of the side surface of the rod, which is exposed to the inside of the air vent passage. The moving member is provided and movable between a first position at which the moving member does not cover the first hole and a second position at which the moving member covers the first hole.

According to one or more embodiments of the present invention, the initial air can be discharged to the outside through a pathway different from that of the liquid.

DESCRIPTION OF EMBODIMENTS

Below, detailed description of an embodiment of the present invention is given with reference to drawings. In the present embodiment, as an example, description is made on hydraulic oil being liquid to be filtrated, but the liquid to be filtrated is not limited to the hydraulic oil. Further, in the present embodiment, as an example, description is made on a return filter, but the filter device according to the present invention is not limited to the return filter.

Figure 1:
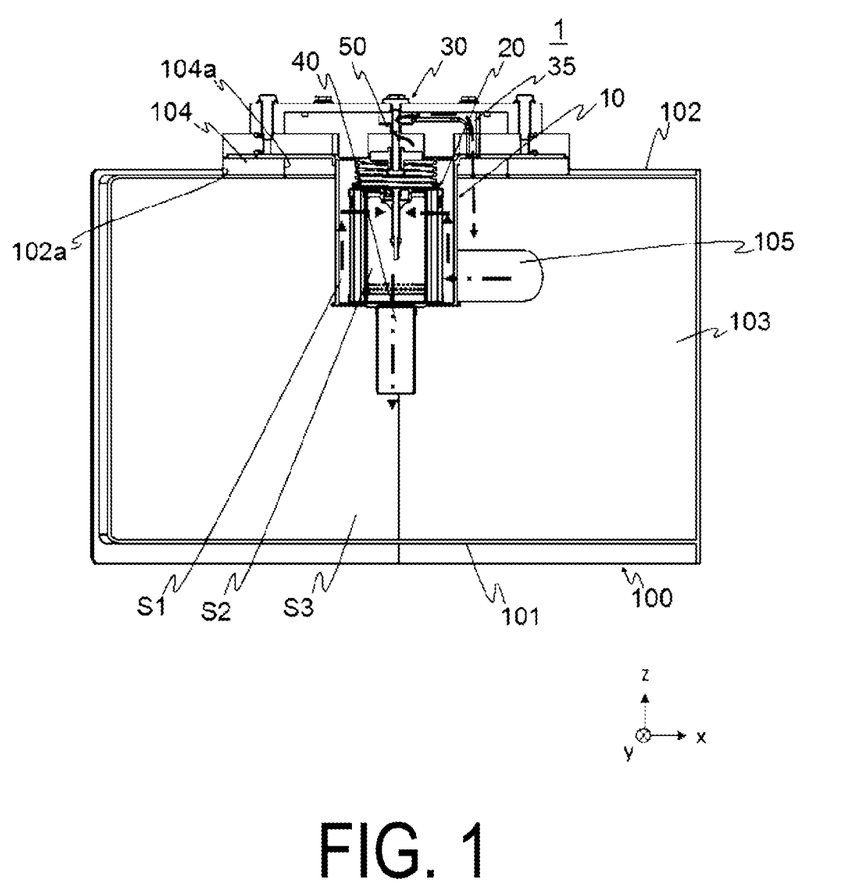
FIG. 1 is a perspective view of an essential part illustrating an overview of a tank 100 in which a return filter 1 according to an embodiment of the present invention is provided.

FIG. 1 is a cross-sectional view illustrating an overview of a tank 100 in which a return filter 1 according to an embodiment of the present invention is provided. Note that, in FIG. 1, hatching for indicating a cross section is omitted.

The tank 100 is installed in a work machine not illustrated (e.g., a hydraulic device) and is provided in a hydraulic circuit of hydraulic oil supplied to the hydraulic device and configured to store the hydraulic oil. However, the tank 100 is not limited to one provided in the hydraulic circuit.

The tank 100 is, for example, formed in a box-like shape and hollow inside. The tank 100 mainly has a bottom surface 101, a top surface 102 facing the bottom surface 101, and a side surface 103 substantially orthogonal to the bottom surface 101 and the top surface 102 (surface on the far side of the drawing sheet in FIG. 1). An opening 102a is formed in the top surface 102.

On the upper side (+z side) of the top surface 102, an attachment plate 104 for attaching the return filter 1 is provided. A through-hole 104a is formed in the attachment plate 104. The return filter 1 is inserted into the tank 100 through the opening 102a and the through-hole 104a. The opening 102a and the through-hole 104a are covered by a lid body 30 (described in detail later) of the return filter 1.

Note that, the attachment plate 104 is not necessarily required. For example, when the top surface 102 of the tank 100 is increased in thickness and the top surface 102 functions as the attachment plate 104, the attachment plate 104 is not required. In the following, it is assumed that the tank 100 includes the attachment plate 104.

An inflow pipe 105 that allows the hydraulic oil to flow in the return filter 1 is fitted into the side surface 103. The inflow pipe 105 introduces the hydraulic oil from the outside of the tank 100 to the return filter 1. The hydraulic oil introduced to the return filter 1 is filtrated with the return filter 1 and is stored in the tank 100.

An outflow port not illustrated that allows the hydraulic oil in the tank 100 to flow out to a hydraulic pump (not illustrated) or the like is formed in the vicinity of the bottom surface 101. A suction strainer not illustrated is provided to the inner side of the tank 100, and the hydraulic oil passing through the suction strainer flows out to the outer side of the tank 100 through the outflow port.

Figure 2:
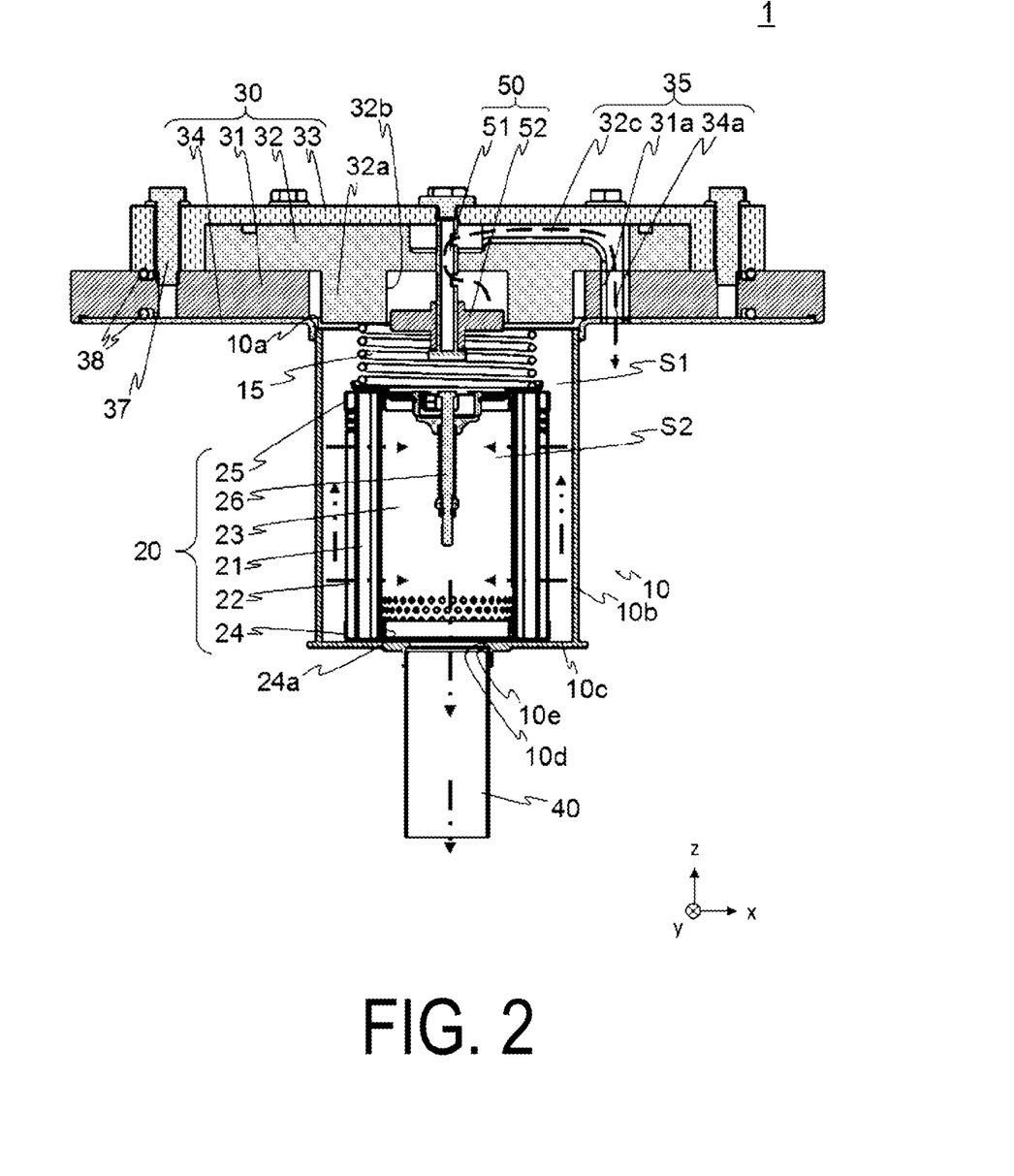
FIG. 2 is a cross-sectional view illustrating an overview of the return filter 1.

Next, the filter device 1 is described. FIG. 2 is a cross-sectional view illustrating an overview of the return filter 1. In FIG. 2, hatching for indicating a cross section is partly omitted.

The return filter 1 mainly includes a case 10, a filter element 20, the lid body 30, an outflow pipe 40, and an air vent portion 50.

The case 10 is formed of a material having high corrosion resistance (e.g., metal such as stainless steel). The case 10 is provided below (−z side of) the lid body 30 and protruding in the tank 100 (see FIG. 1).

The case 10 has a bottomed substantially-cylindrical shape and has an upper end surface being an opening 10a. The case 10 is hollow inside and mainly provided with the filter element 20 therein.

An inflow port (not illustrated) that allows the hydraulic oil to flow in the case 10 is formed in a side surface 10b. The inflow pipe 105 (see FIG. 1) is coupled to the inflow port. The inflow port formed in the side surface 10b and the inflow pipe 105 function as an inflow portion. When the hydraulic oil flows in through the inflow portion, the hydraulic oil is stored in the case 10.

Holes 10d and 10e are formed in a substantially center part of a bottom surface 10c. The hole 10e has an inner diameter larger than that of the hole 10d, and the outflow pipe 40 is engaged into the hole 10e.

The filter element 20 has a bottomed substantially-cylindrical shape and is provided inside the case 10. Further, the filter element 20 is provided to a side lower than the air vent portion 50.

The filter element 20 mainly includes a filtration member 21, an outer cylinder 22, an inner cylinder 23, plates 24 and 25, and a valve 26.

The filtration member 21 is a member having a substantially hollow cylindrical shape and includes openings at both ends. The filtration member 21 is formed by pleating a filter paper such as synthetic resin or paper and connecting both ends of the pleated filter paper to form a cylindrical shape. The outer cylinder 22 in which holes allowing the hydraulic oil to pass therethrough are formed in a substantially entire area is provided to the outer side of the filtration member 21. Further, the inner cylinder 23 in which holes allowing the hydraulic oil to pass therethrough are formed in a substantially entire area is provided to the inner side of the filtration member 21. However, the outer cylinder 22 and the inner cylinder 23 are not necessarily required.

The plate 24 is provided at an end on the lower side of the filtration member 21, and the plate 25 is provided at an end on the upper side of the filtration member 21. The plate 24 covers the lower end surfaces of the filtration member 21, the outer cylinder 22, and the inner cylinder 23, and the plate 25 covers the upper end surfaces of the filtration member 21, the outer cylinder 22, and the inner cylinder 23. The plates 24 and 25 are members having a substantially disc shape or a bottomed substantially-cylindrical shape and are formed of resin or metal.

An opening 24a is formed in a substantially center part of the plate 24 at a position overlapping with the hollow portion of the filtration member 21 in a plan view (as viewed in the z direction). Thus, a space (space S2) inside the filtration member 21 communicates with the outflow pipe 40 through the opening 24a and the hole 10e. The opening 24a, the hole 10e, and the outflow pipe 40 function as an outflow portion. The outflow portion passes through the bottom surface 10c and communicates with the space S2 and a space outside the case 10.

The valve 26 is provided to the plate 25. As illustrated in FIG. 2, the valve 26 is normally closed. However, when the filtration member 21 is clogged and a pressure inside the case 10 is increased, the valve 26 is opened, and the hydraulic oil flows in from a space (space S1) in the case 10 and outside the filter element 20 into the space S2. In this manner, damage to the return filter 1 is prevented. The valve 26 may be one already known, and hence description thereof is omitted. Note that, the valve 26 is not necessarily required.

Further, a valve not illustrated is provided to the plate 25. The valve is used for discharging air from the space S2 to the space S1. The valve may be one already known, and hence description thereof is omitted.

An elastic member 15 is provided between the plate 25 and the lid body 30 (an upper side of the plate 25). The elastic member 15 is a coil spring, for example and presses the filter element 20 downward (in the −z direction). As a result, the filter element 20 is held inside the case 10.

The lid body 30 is provided to the outer side of the tank 100 (in the present embodiment, on the upper side of the attachment plate 104 provided to the outer side of the tank 100) (see FIG. 1). The lid body 30 mainly includes a first lid 31, a second lid 32, a third lid 33, and an attachment plate 34.

The first lid 31, the second lid 32, and the attachment plate 34 are substantially plate-like members, and the third lid 33 is a substantially-cylindrical member having one end being covered. The second lid 32 is provided on the upper side of the first lid 31. The third lid 33 is provided on the upper side of the first lid 31 and covers the second lid 32. The third lid 33 is fixed to the first lid 31 with a bolt 37. With this, the first lid 31, the second lid 32, and the third lid 33 are integrated.

A protruding portion 32a, which has a distal end inserted into the case 10, is formed on the lower surface of the second lid 32. Further, a recessed portion 32b is formed in the end surface of the protruding portion 32a. The inner space of the recessed portion 32b is included in the space S1.

The attachment plate 34 is provided on the lower side of the first lid 31. Further, the attachment plate 34 is provided in the vicinity of the opening 10a in the side surface 10b of the case 10. With this, the lid body 30 is provided to the case 10 and covers the opening 10a in the upper end surface of the case 10. Note that, the attachment plate 34 is not necessarily required.

The first lid 31 is fixed to the attachment plate 104 (see FIG. 1) through intermediation of the attachment plate 34. With this, the lid body 30 is fixed to the tank 100.

Sealing members 38 (for example, O-rings) are provided between the first lid 31 and the third lid 33 and between the first lid 31 and the attachment plate 34 so as to prevent the hydraulic oil from leaking to the outside.

Note that, in the present embodiment, the first lid 31 and the second lid 32 are independent components, but the first lid 31 and the second lid 32 may be one component. Further, in the present embodiment, the first lid 31 and the attachment plate 34 are independent components, but the first lid 31 and the attachment plate 34 may be one component.

An air vent pit (passage) 35 is formed in the lid body 30. The air vent pit 35 has a substantially L-like shape in a side view (as viewed in the y direction) and allow communication between the space inside the case 10 and the space outside the case 10 through the air vent portion 50.

The air vent pit 35 mainly has a pit 32c formed in the second lid 32, a hole 31a formed in the first lid 31, and a hole 34a formed in the attachment plate 34.

The hole 31a and the hole 34a are formed at positions on the outer side with respect to the case 10 in a plan view. Therefore, the end of the air vent pit 35 is opened to the lower surface of the lid body 30 (the surface on the −z side), to the outer side with respect to the case 10 in a plan view, and to the inner side of the tank 100 (see FIG. 1). With this, the air vent pit 35 and a space (space S3) inside the tank 100 and outside the case 10 communicate with each other (see FIG. 1).

Figure 3:
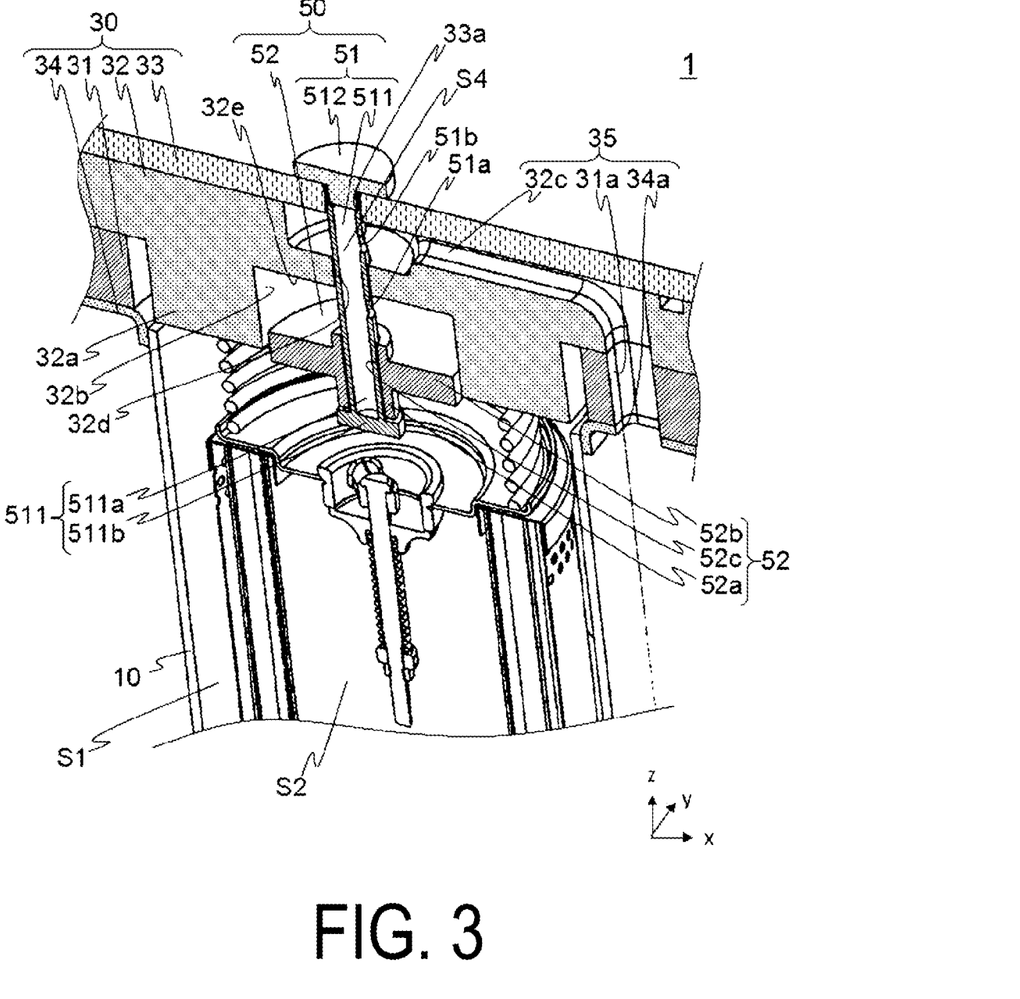
FIG. 3 is a perspective view illustrating an overview of the return filter 1, which is partially enlarged to illustrate a cross section.
Figure 4:
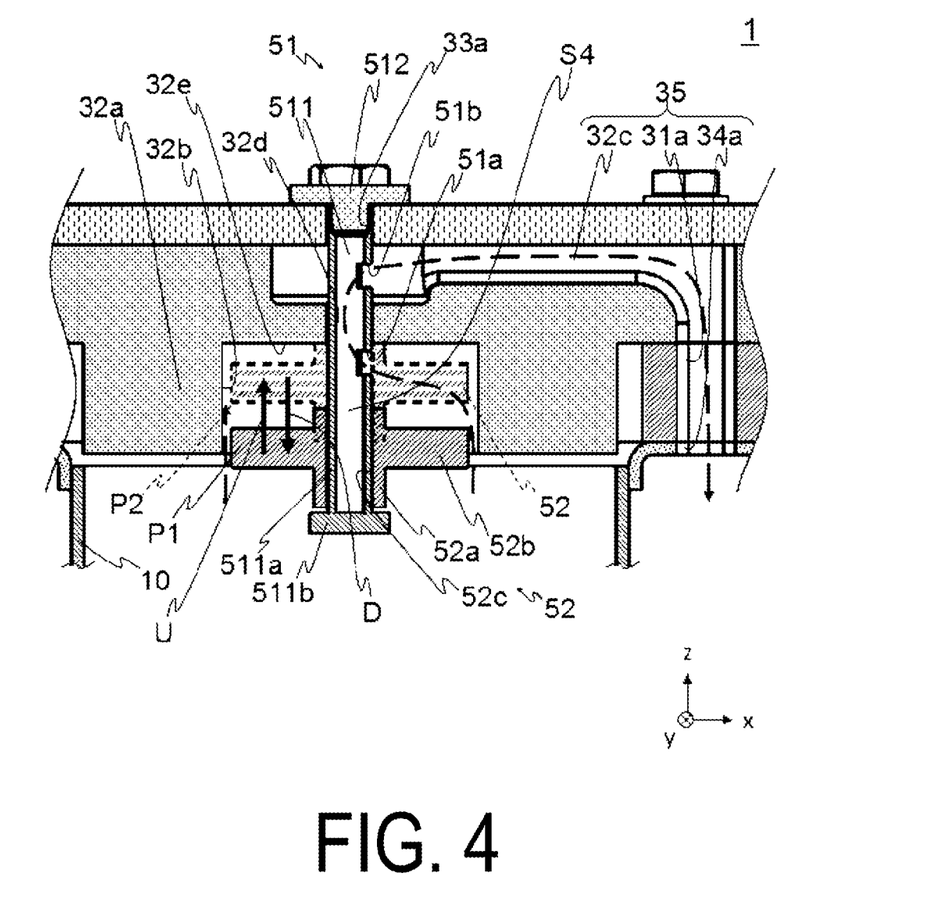
FIG. 4 is an enlarged partial view of FIG. 2.

The air vent portion 50 is for discharging the air in the case 10 to the outside of the case 10 and mainly includes a rod 51 and a moving member 52. With reference to FIG. 3 and FIG. 4, the air vent portion 50 is described.

FIG. 3 is a perspective view illustrating an overview of the return filter 1, which is partially enlarged to illustrate a cross section. FIG. 4 is an enlarged partial view of FIG. 2. In FIG. 3 and FIG. 4, hatching for indicating a cross section is partly omitted.

The rod 51 is provided to the lid body 30 and protruding in the recessed portion 32b and the case 10. The rod 51 mainly has a cylindrical body 511 and a pin 512.

The cylindrical body 511 includes a cylindrical portion 511a having a substantially-cylindrical shape and a flange portion 511b that covers a lower end of the cylindrical portion 511a. The cylindrical body 511 in inserted into the pit 32c; a hole 32d formed between the recessed portion 32b and the pit 32c; and a hole 33a formed in the third lid 33 and is fixed to the pin 512 from the outer side of the third lid 33.

With this, both the ends of the rod 51 are covered, and a space S4 is formed inside the cylindrical body 511.

The cylindrical body 511 protrudes downward (to the inside of the case 10) from the lid body 30. A hole 51a is formed in a portion of the side surface of the cylindrical body 511, which is exposed to the inside of the case 10. The hole 51a allows the space S1 and the space S4 to communicate with each other.

A hole 51b is formed in a portion of the side surface of the cylindrical body 511, which is exposed to the pit 32c. The hole 51b allows the air vent pit 35 and the space S4 to communicate with each other.

The moving member 52 is a member having a substantially disc shape and is floatable on the hydraulic oil. The moving member 52 may be formed of a material having a specific weight less than that of the hydraulic oil (for example, a material having a density of 0.7 g/cm$^3$ or larger) so as to float on the hydraulic oil or may be formed of a material having a specific weight larger than that of the hydraulic oil but a hollow space inside so as to float on the hydraulic oil.

The moving member 52 has a thick portion 52a having a substantially-cylindrical shape and a thin portion 52b, which is formed in the periphery of the thick portion 52a and has a substantially disc shape. A tubular hole 52c into which the cylindrical portion 511a is inserted is formed in the thick portion 52a. The tubular hole 52c slides along the cylindrical portion 511a so that the moving member 52 moves along the rod 51.

It is preferred that the gap between the outer circumferential surface of the cylindrical portion 511a and the inner circumferential surface of the tubular hole 52c be such a minimum gap that adhesion of the cylindrical portion 511a and the tubular hole 52c is avoided due to the hydraulic oil (for example, approximately from 1 mm to 2 mm).

The moving member 52 is floatable on the hydraulic oil and hence moves from a position P1 (see the solid line in FIG. 4) at which the hole 51a is not covered to a position P2 (see the broken line in FIG. 4) at which the hole 51a is covered, along with rise of a liquid surface. Further, the moving member 52 moves from the position P2 to the position P1 along with lowering of the liquid surface.

At the position P1, the lower surface of the thick portion 52a abuts the flange portion 511b. At the position P2, the upper surface of the thick portion 52a abuts the lower surface of the lid body 30 (here, a bottom surface 32e of the recessed portion 32b).

The thick portion 52a has a diameter equal to or less than two times the inner diameter of the tubular hole 52c. By setting the diameter of the thick portion 52a to a smaller value, a contact surface between the thick portion 52a and the flange portion 511b and a contact surface between the thick portion 52a and the lid body 30 are reduced. Therefore, due to a surface tension of the hydraulic oil, the thick portion 52a is prevented from adhering to the flange portion 511b and the lid body 30 (the bottom surface 32e).

The thin portion 52b has an outer diameter substantially the same as the inner diameter of the recessed portion 32b. Note that, such a minimum gap that adhesion is avoided due to the hydraulic oil (for example, approximately from 1 mm to 2 mm) is formed between the outer diameter of the thin portion 52b and the inner diameter of the recessed portion 32b, and this case is also regarded as the case where the outer diameter and the inner diameter is substantially the same.

At least a part of the outer circumferential surface of the thin portion 52b faces the inner circumferential surface of the recessed portion 32b at the position P1. Therefore, when the moving member 52 moves along the rod 51, the outer circumferential surface of the thin portion 52b moves along the inner circumferential surface of the recessed portion 32b. With this, movement of the moving member 52 is guided by the recessed portion 32b, and the moving member 52 can move smoothly.

Next, the function of the return filter 1 thus configured is described. The chain double-dashed line arrows in FIG. 1 and FIG. 2 indicate the flow of the hydraulic oil.

The hydraulic oil flowing in the space S1 through the inflow pipe 105 flows in from the outer side to the inner side of the filtration member 21, and the hydraulic oil after filtration flows out to the space S2 on the inner side of the filtration member 21. The hydraulic oil after filtration flowing out to the space S2 flows out to the space S3 through the outflow pipe 40.

In a state before the hydraulic oil is filtrated through use of the return filter 1, an initial air fills the spaces S1 and S2. The hydraulic oil flows in the case 10, and an oil surface in the case 10 is raised (moves in the +z direction). Along with this, the initial air passes through the air vent portion 50 and the air vent pit 35 and is discharged from the spaces S1 and S2 to the space S3 (see the long chain lines in FIG. 1 and FIG. 2). In the following, with reference to FIG. 4, discharge of the air is descried in detail.

Until the oil surface abuts the back surface of the thin portion 52b, the moving member 52 is at the position P1. Under this state, the air flows in the space S4 through the hole 51a along with the hydraulic oil flowing in the case 10 and then is discharged to the space S3 through the hole 51b and the air vent pit 35.

When the hydraulic oil continues flowing in the case 10, the oil surface abuts the back surface of the thin portion 52b, and the oil surface pushes the moving member 52 upward. With this, the moving member 52 moves upward (see the bold arrow U in FIG. 4). When the moving member 52 moves from the position P1 to the position P2, the moving member 52 covers the hole 51a. Thus, the air and the hydraulic oil do not flow in the space S4. Thus, the hydraulic oil before filtration can be prevented from flowing out into the tank 100.

When the oil surface is lowered due to stop of a work machine or the like, the moving member 52 moves downward along with this (see the bold arrow D in FIG. 4). The diameter of the thick portion 52a is small, specifically, equal to or less than two times the inner diameter of the tubular hole 52c. Thus, the thick portion 52a does not adhere to the lid body 30 due to a surface tension of the hydraulic oil, and the moving member 52 also moves downward together with the lowering oil surface. Even when the thick portion 52a adheres to the lid body 30, adhesion of the thick portion 52a and the lid body 30 can be released due to the weight of the moving member 52 because the moving member 52 is heavier than the contact surface between the thick portion 52a and the lid body 30.

According to the present embodiment, in order to discharge the initial air through the air vent portion 50, the initial air can be discharged to the outside of the return filter 1 through a pathway different from that of the hydraulic oil to be discharged through the outflow pipe 40. Further, according to the present embodiment, the air vent portion 50 is provided to the lid body 30. Thus, a related-art return filter can easily be replaced with the return filter 1 according to the present embodiment simply by replacing a lid of the related-art return filer with the lid body 30 in the present embodiment.

Further, according to the present embodiment, the air vent pit 35 has a substantially L-like shape in a side view, and the air vent pit 35 and the air vent portion 50 allow the space S1 and the space S3 to communicate with each other. Thus, even when the hydraulic oil flows in the air vent pit, the hydraulic oil can be returned to the tank to prevent leakage to the outside.

Note that, in the present embodiment, the hole 51*b* allows the space S4 and the air vent pit 35 to communicate with each other, and the air in the case 10 is discharged to the space S3 through the space S4 and the air vent pit, but modes of the hole 51*b* and the air vent pit 35 are not limited to those described above. For example, the air vent pit may be opened to the surface of the third lid 33 on the upper side. Further, for example, the air vent pit 35 may not be formed, and the cylindrical body 511 may pass through the third lid 33 so that the air in the space S4 is directly discharged to the outside of the return filter 1. However, in order to prevent leakage of the hydraulic oil to the outside even when the hydraulic oil flows in the space S4, it is preferred that the air vent pit 35 and the space S3 communicate with each other.

Note that, in the present embodiment, the moving member 52 includes the thick portion 52*a* and the thin portion 52*b* and has a substantially cross-like shape in a side view, but the shape of the moving member 52 is not limited thereto. For example, the moving member may have a substantially elliptical shape in a side view. Further, for example, the moving member may have a substantially-cylindrical shape in a side view, and protruding portions may be formed on the upper and lower end surfaces.

The embodiment of the invention has been described in detail with reference to the drawings. However, specific configurations are not limited to the embodiment, and changes in the design or the like are also included within a scope which does not depart from the gist of the invention. For example, the above examples have been explained in detail in order to facilitate understanding of the present invention and are not necessarily limited to examples provided with the entirety of the configuration described above. In addition, the configuration of an embodiment may be partially replaced with the configuration of a different embodiment, or the configuration of the different embodiment may be added to, deleted from, or replaced with the configuration of the embodiment.

In addition, the term "substantially" is not to be understood as merely being strictly the same and is a concept that includes errors and modifications to an extent that does not result in loss in identity. For example, a "bottomed substantially-cylindrical shape" is not strictly limited to a cylindrical shape and is a concept that includes a case where a shape is regarded as the same as the cylindrical shape. Further, simple expressions such as orthogonal, parallel, and identical are not to be understood as merely being strictly orthogonal, parallel, identical, and the like and include being substantially parallel, substantially orthogonal, substantially identical, and the like.

In addition, the term "vicinity" means to include a range of regions (which can be determined as desired) near a position serving as a reference. For example, the term "a vicinity of an end" refers to a range of regions near the end, and is a concept indicating that the end may or may not be included.

REFERENCE SIGNS LIST

1 Return filter
10 Case
10*a* Opening
10*b* Side surface
10*c* Bottom surface
10*d*, 10*e* Hole
15 Elastic member
20 Filter element
21 Filtration member
22 Outer cylinder
23 Inner cylinder
24, 25 Plate
24*a* Opening
26 Valve
30 Lid body
31 First lid
31*a* Hole
32 Second lid
32*a* Protruding portion
32*b* Recessed portion
32*c* Pit
32*d* Hole
32*e* Bottom surface
33 Third lid
33*a* Hole
34 Attachment plate
34*a* Hole
35 Air vent pit (passage)
37 Bolt
38 Sealing member
40 Outflow pipe
50 Air vent portion
51 Rod
51*a*, 51*b* Hole
52 Moving member
52*a* Thick portion
52*b* Thin portion
52*c* Tubular hole
100 Tank
101 Bottom surface
102 Top surface
102*a* Opening
103 Side surface
104 Attachment plate
104*a* Through-hole
105 Inflow pipe
511 Cylindrical body
511*a* Cylindrical portion
511*b* Flange portion
512 Pin

The invention claimed is:

1. A filter device, comprising:
a case that has a cylindrical shape with an opened upper end surface;
a lid body that covers the upper end surface;
a rod provided to the lid body and protruding in the case;
a float that is floatable on a liquid, the float including a tubular hole into which the rod is inserted, the float moving along the rod by the tubular hole sliding along the rod;
a filter element provided in the case and to a lower side with respect to the rod and the float;
an inflow portion that allows a space inside the case and outside the filter element to communicate with a space outside the case; and an outflow portion that allows a space inside the filter element and the space outside the case to communicate with each other; wherein an air vent passage is formed in the lid body, the rod is a substantially-cylindrical member with both ends covered, a first hole is formed on a side surface of the rod, which is exposed to the inside of the case, a second hole is formed on the side surface of the rod, which is exposed to the inside of the air vent passage, and the float is provided and movable between a first position at which the float does not cover the first hole and a second position at which the float covers the first hole.

2. The filter device according to claim 1, wherein the case stores the liquid to be filtered, the float moves from the first position to the second position with a rise of a liquid surface, and when the float is at the second position, a diameter of a portion in which the float and a back surface of the lid body abut each other is equal to or less than two times an inner diameter of the tubular hole.

3. The filter device according to claim 1, wherein a recessed portion is formed in a back surface of the lid body, the rod protrudes in the recessed portion, the float has an outer diameter substantially equal to an inner diameter of the recessed portion, and when the float is at the first position, at least a part of an outer circumferential surface of the float faces an inner circumferential surface of the recessed portion.

4. The filter device according to claim 1, wherein the lid body is provided to an outer side of a tank, the case is provided inside the tank through an opening formed in the tank, and the air vent passage has a substantially L shape in a side view, and includes an end opened to a lower surface of the lid body to allow a space inside the case and the space outside the case to communicate with each other.

5. The filter device according to claim 2, wherein a recessed portion is formed in the back surface of the lid body, the rod protrudes in the recessed portion, the float has an outer diameter substantially equal to an inner diameter of the recessed portion, and when the float is at the first position, at least a part of an outer circumferential surface of the float faces an inner circumferential surface of the recessed portion.

6. The filter device according to claim 2, wherein the lid body is provided to an outer side of a tank, the case is provided inside the tank through an opening formed in the tank, and the air vent passage has a substantially L shape in a side view, and includes an end opened to a lower surface of the lid body to allow a space inside the case and the space outside the case to communicate with each other.

7. The filter device according to claim 3, wherein the lid body is provided to an outer side of a tank, the case is provided inside the tank through an opening formed in the tank, and the air vent passage has a substantially L shape in a side view, and includes an end opened to a lower surface of the lid body to allow a space inside the case and the space outside the case to communicate with each other.

8. The filter device according to claim 5, wherein the lid body is provided to an outer side of a tank, the case is provided inside the tank through an opening formed in the tank, and the air vent passage has a substantially L shape in a side view, and includes an end opened to a lower surface of the lid body to allow a space inside the case and the space outside the case to communicate with each other.

9. A filtration apparatus, comprising:

a tank including an opening formed in a top surface of the tank; and a filter device provided to the tank, the filter device including:

a case that has a cylindrical shape and is provided inside the tank through the opening;

a lid body that covers the opening and an upper surface of the case and is provided to an outer side of the tank;

a rod provided to the lid body and protruding in the case;

a float including a tubular hole into which the rod is inserted, the float moving along the rod by the tubular hole sliding along the rod;

a filter element provided in the case and to a lower side with respect to the rod and the float;

an inflow portion that allows a space inside the case and outside the filter element to communicate with a space outside the case; and an outflow portion that allows a space inside the filter element and the space outside the case to communicate with each other; wherein an air vent passage, which has a substantially L shape in a side view and includes one end opened to a lower surface of the lid body to allow a space inside the tank and outside the case and a space inside the case to communicate with each other, is formed in the lid body, the rod is a substantially-cylindrical member with both ends being covered, a first hole is formed on a side surface of the rod, which is exposed to the inside of the case, a second hole is formed on the side surface of the rod, which is exposed to the inside of the air vent passage, and the float is provided and movable between a first position at which the float does not cover the first hole and a second position at which the float covers the first hole.

* * * * *